May 26, 1942.  V. J. LOWE ET AL  2,284,435
APPARATUS FOR PRODUCING COOKED CASEIN
Filed July 25, 1940   5 Sheets-Sheet 1

Inventors
Vernon J. Lowe
Arthur W. Bean
By Foster Codier  Attorney

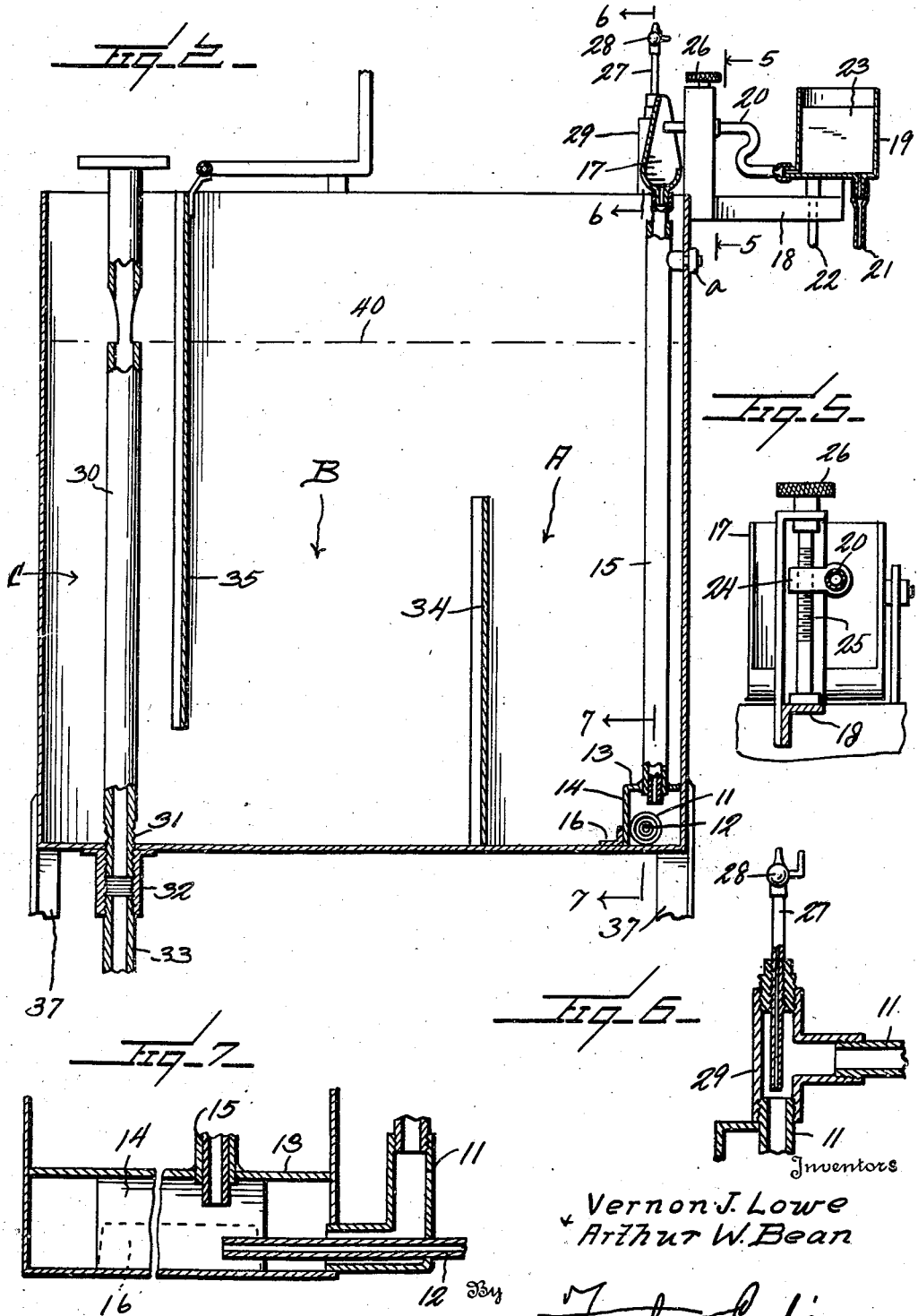

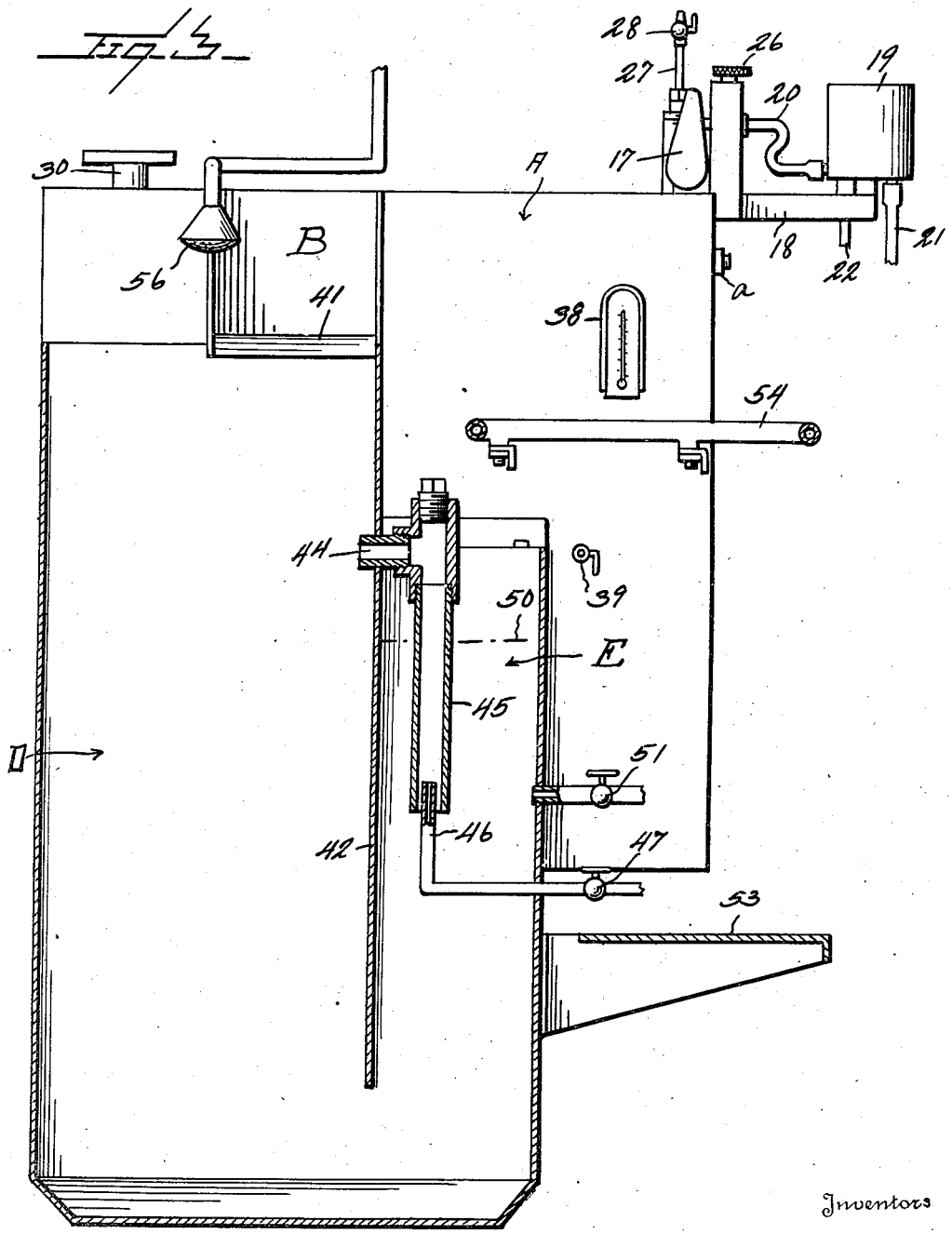

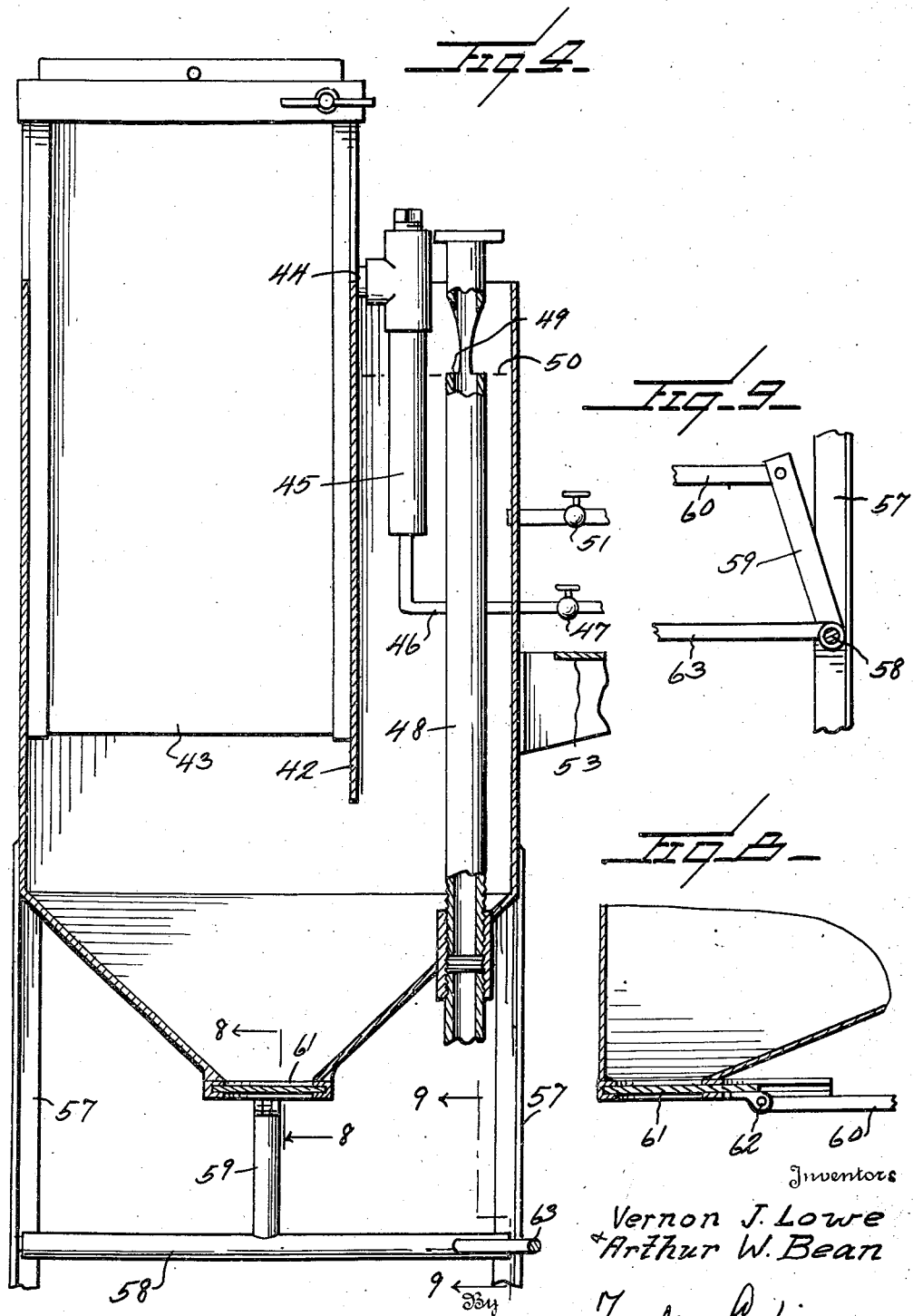

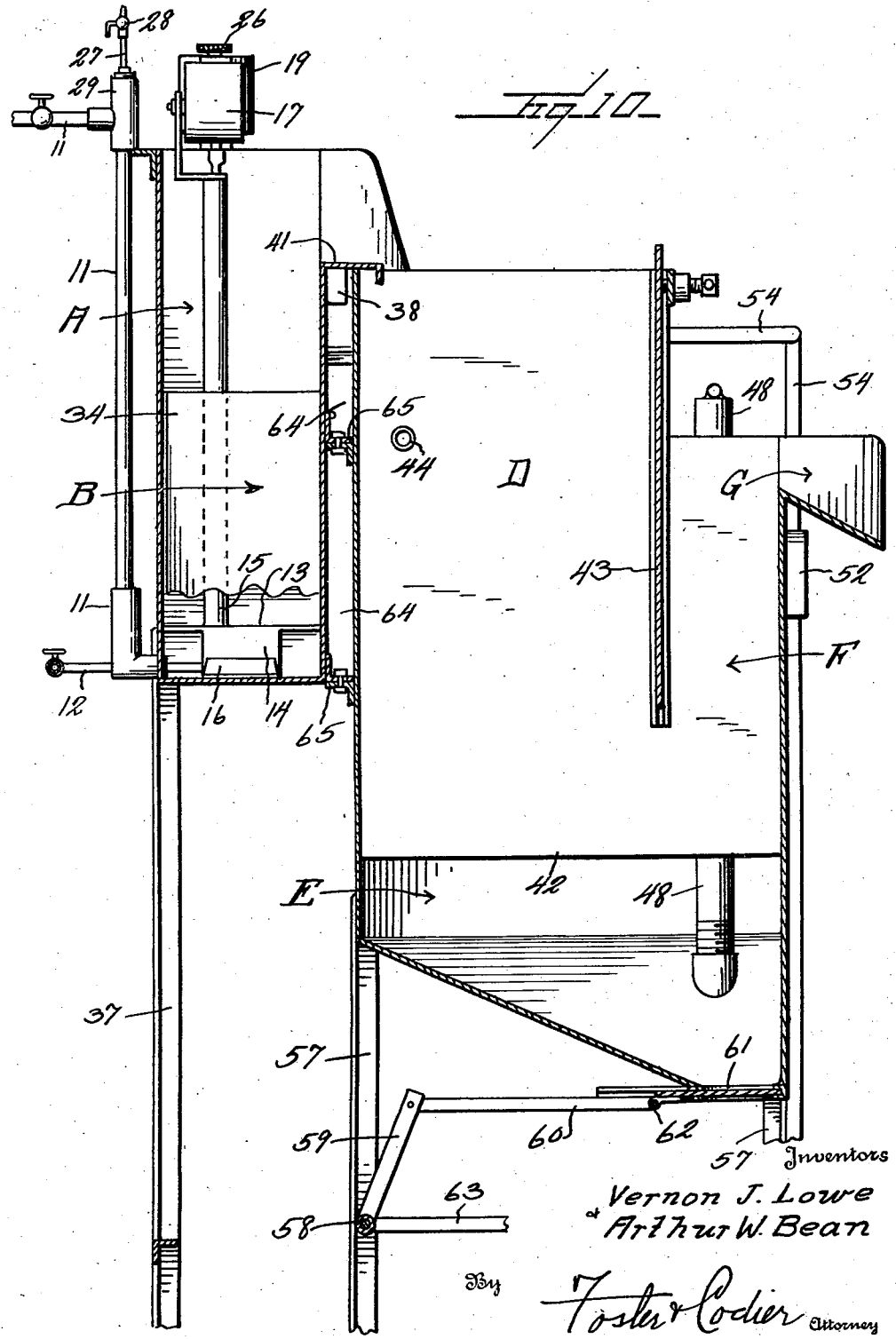

Patented May 26, 1942

2,284,435

UNITED STATES PATENT OFFICE 2,284,435

APPARATUS FOR PRODUCING COOKED CASEIN

Vernon J. Lowe and Arthur W. Bean, Marengo, Ill., assignors to The Borden Company, New York, N. Y., a corporation of New Jersey Application July 25, 1940, Serial No. 347,510

6 Claims. (Cl. 23—260)

The present invention relates to an apparatus for the production of cooked casein from skim milk, and has for its object the provision of an efficient and economical apparatus for producing cooked casein of uniform high quality, in an economical manner. The apparatus is so designed and constructed as to be largely automatic in operation, but capable of adjustment to meet the varying conditions which are encountered in actual practice.

An important advantage in producing cooked casein, in preference to other kinds of casein in creameries not large enough to maintain a casein dryer, is that the cooked casein, even though containing about 60% of water, can be kept without refrigeration, for several weeks even in warm weather, without danger of putrification. Pressed casein, containing the same amount of water would become putrid in warm summer weather within two or three days. Pressed casein accordingly (if it is to be stored) has to be dried directly after being made, and usually in the same factory.

The present application is in part a continuation of application 219,105, filed July 13, 1938, on which application, Patent No. 2,225,387 issued on December 17, 1940.

The apparatus is shown diagrammatically in the annexed drawings, forming a part of the present application. In said drawings:

Fig. 2 is a vertical section, partly in elevation, taken on the line 2—2 of Figure 1.

Fig. 3 is a vertical section, partly in elevation, on the line 3—3 of Figure 1.

Fig. 4 is a vertical section, partly in elevation, on the line 4—4 of Figure 1, (with the curdler tank omitted).

Fig. 5 is a detail view on the line 5—5 of Figure 2, looking from the right, showing the adjustment for the acid feed, and showing the special funnel into which the acid is delivered.

Fig. 6 is a vertical section (partly in elevation) showing the skim milk inlet and aerating device therefor, this being taken on the line 6—6 of Figure 2, but with the acid funnel removed.

Fig. 7 is a vertical section of the mixing and circulating chamber, into which the aerated skim milk, acid and steam are introduced. This view is on the line 7—7 of Fig. 2.

Fig. 8 is an outlet gate valve in the bottom of the cooking and washing compartment, this being used at the end of a run, for clean-out purposes. This view is on line 8—8 of Fig. 4.

Fig. 9 is a detail of a simple and convenient operating mechanism for said outlet valve.

Fig. 10 is a section on line 10—10, Fig. 1.

Figure 1:
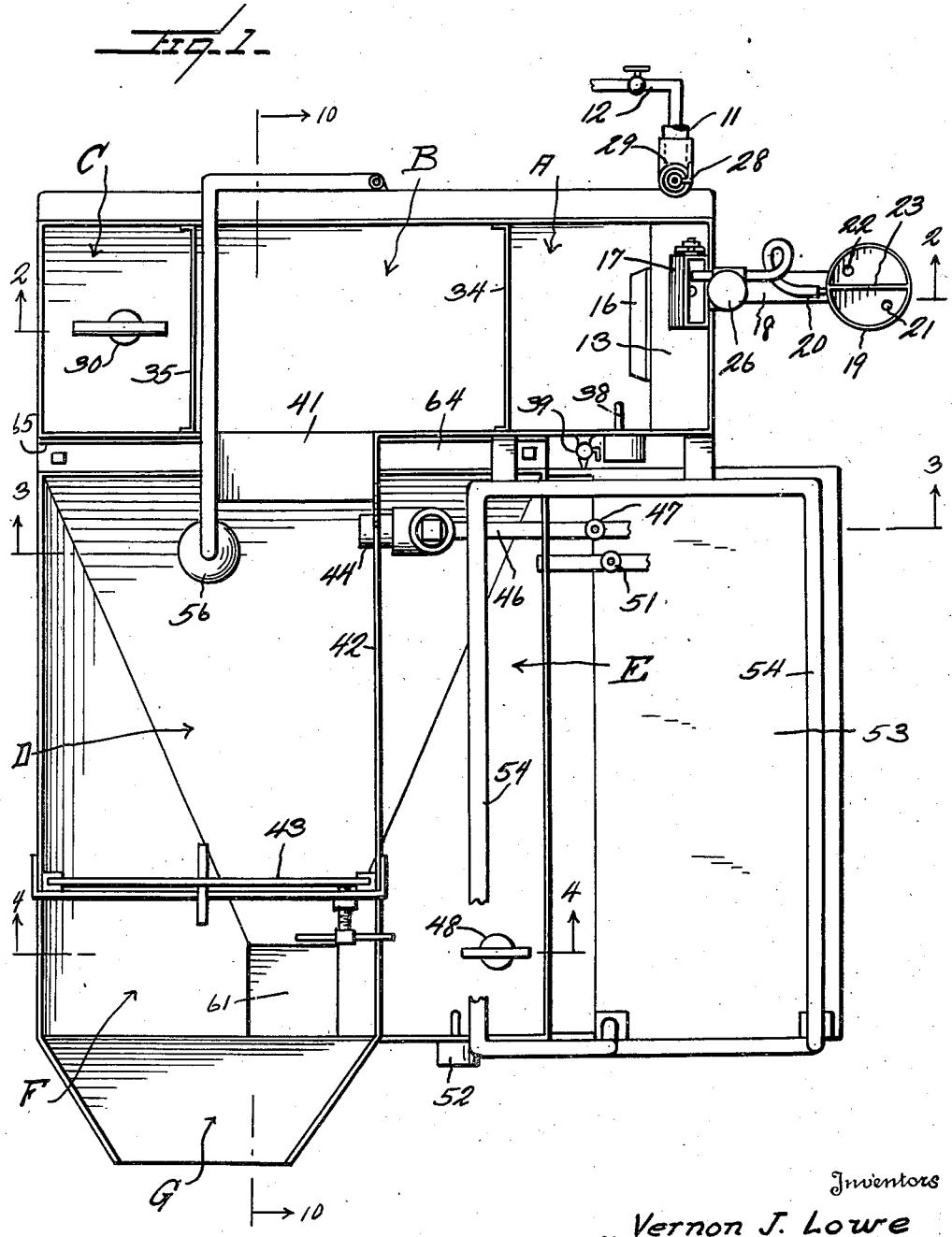
Fig. 1 is a top plan view (parts being shown in section) of the entire apparatus.

The bottom of Fig. 1 will be considered as the front of the apparatus, and the top of this figure will be considered as the back of the apparatus.

The apparatus consists essentially of a series of tanks and associated parts. The tanks are also provided with baffles, extending from the top in some cases, and from the bottom in other cases, to divide the tanks into compartments.

Milk is supplied through pipe 11, into the bottom of compartment A of the curdling tank, and 12 represents a valved steam inlet pipe, for introducing a small amount of steam for regulating the temperature of the skim milk and for producing agitation of the skim milk to cause quick and intimate mixing of the skim milk with the acid introduced. The milk from pipe 11 and the steam from pipe 12 enter a small mixing compartment defined by a horizontal plate 13 carrying a downwardly extending vertical plate 14 which is shorter than 13, while an acid feed pipe 15 enters this mixing compartment from above. In this compartment accordingly the milk and the acid will be very thoroughly mixed. The floor of this compartment is the floor of compartment A which constitutes the precipitating compartment of tank A—B—C. Attached to the floor of compartment A is a short angle iron 16 which causes the plate 14 to be retained in its proper position. Pipe 15 is lined with an acid-resisting material as shown, and this pipe carries a specially designed funnel at its top, shown at 17. By removing the nut a, the acid pipe 15 carrying funnel 17 and plates 13 and 14 can be removed for cleaning, after each run of the process. Mounted on a stationary bracket 18 is a constant level tank 19 for supplying acid, through a flexible pipe 20, into the top of the funnel 17. Tank 19 is provided with an acid inlet 21 and an acid outlet 22 and upstanding baffle 23, the height of the latter defining the height of the acid in the said compartment of the said tank 19. At a point near the outlet of the flexible pipe 20, this pipe is supported by a bracket 24 mounted on a vertical screw 25 having handle 26, for adjustment of the acid outlet, and accordingly for controlling the amount of acid delivered into the funnel 17.

For producing substantially uniform running of the apparatus, with a minimum of attendance, the skim milk is introduced at a uniform rate of flow through pipe 11. The amount of acid required to effect a thorough precipitation varies, depending upon acidity of the milk and temperature of the milk, season of the year and other factors presenting themselves in different localities. The best amount of acid to employ is usually determined by the acidity of the whey immediately after precipitating. Technical sulphuric acid is usually of 93 to 95% strength with a specific gravity of 1.835, however, we usually dilute one (1) part of technical sulphuric acid with six (6) parts of water, before feeding this to the apparatus. When 18 to 20 degree Bé. muriatic acid (i. e. 28 to 31.5% strength) is used, our dilution is usually (1) part of acid to two (2) parts of water.

In the top of the vertical portion of the milk supply pipe 11, there is introduced a small pipe 27, having a cock 28 at its top, for allowing the syphonic action of the milk introduced through pipe 11 to draw in a small amount of air, which amount of air is adjusted by the cock 28. This aerates the milk, (i. e., incorporates air into the milk) and this air so incorporated, in conjunction with the low degree of acidity, gives a proper non-granular soft casein which will float on the liquid in compartments A and B, under the conditions of operation. Sufficient steam is introduced through pipe 12 to give in the mixing chamber below plate 13, a temperature of about 110 to 120° F., this temperature being controlled by adjustment of the valve in pipe 12.

The whey level in the curding tank (composed of the three compartments A, B and C), is regulated by raising or lowering the whey draw-off pipe 30 in compartment C, this being threaded at 31. 32 is a flanged coupling, the flange being attached to the bottom of the tank, and 33 is a continuation of pipe 30, for conducting the whey to a suitable storage tank or other place of disposal. The curdling tank is divided into three compartments, A, B and C by the up-standing baffle 34 and downwardly extending baffle 35. The curdling tank is supported on suitable posts, for example made of angle iron 37. At 38 is shown a thermometer, and at 39 a test cock for drawing off samples of the whey, from time to time, for testing. The whey level in the three compartments of the curdler is maintained at 40, by the perforations in pipe 30, and the casein or curd will float on the top of the whey in compartments A and B. The curd leaves the compartment B over the inclined plate 41, into the washing and cooking compartment.

The washing and cooking compartment D is a portion of the tank composed of compartments D, E and F, said tank being divided by a downwardly extending baffle 42, and a vertically movable downwardly extending baffle 43, the latter extending downwardly to a less distance than does 42. In the compartment D the incoming casein curd from compartment B, while in a soft loose condition containing only a very small amount of whey and excess acid, drops in front of the hot water inlet pipe 44. Here the casein is broken up and washed by a strong stream of hot water coming from compartment E. The vertical pipe 45 can be open at its bottom, with a steam pipe 46 provided with valve 47, projecting upwardly into the open bottom of 45. Hot water may be supplied to the pipe 44 in any other suitable manner. Preferably the stream of hot water coming from pipe 44 is driven with a force equivalent to a pressure of 10 to 20 pounds, this water being at a temperature substantially over 150, but not above 180° F. A temperature of 165° F. is very satisfactory.

The baffle 34 extends from the bottom of tank A—B—C upwardly to below the normal liquid level in said tank, but in Fig. 10 we have broken this away at the bottom, to more clearly show the mixing compartment defined by plate 13, plate 14, held in proper place by the angle iron 16.

The water level is maintained in the tank D, E, F, by screwing upwardly or downwardly the pipe 48 which is provided with cut-away portions 49, giving the water level 50, which is substantially below the hot water inlet 44 to compartment D. Water is introduced to compartment E, preferably continuously, through pipe 51 having a valve therein.

Soon after the tearing up of the lumps of soft casein entering compartment D from the overflow 41, by the strong stream of hot washing water from 44, the casein in compartment D, still in contact with the hot water, will commence to coalesce into "cooked casein" which is a rather tough hard material, this also floating on the water in compartment D. The water level in compartment D will be gradually lowered by the cooked casein floating on top of this water until the cooked casein flows under the movable baffle 43 into compartment F, the wash water coming partly into compartment F and partly into compartment E, which two compartments are in contact with each other at the bottom, below the lower end of baffle 42. The cooked casein in compartment F, the free water therein having largely settled out into the bottom of this compartment, overflows at G into suitable receptacles for example metal barrels, to be shipped to a drying plant. Although the cooked casein leaving the apparatus at G contains about the same percentage of water as ordinary pressed casein (i. e. about 60% water) cooked casein can be kept for a period of several weeks, even in hot summer weather, without becoming putrid.

On compartment E is provided a thermometer 52 for showing the temperature of the water in this compartment.

There is preferably provided a platform 53, reached by a ladder, for the workmen to use in observing the operations of the process, for taking samples and for making various adjustments of the apparatus. A hand-rail 54 may be suitably supported above this platform.

The operation of the apparatus has mostly been described above, but it is desired to point out that the supply of skim milk through 11 is preferably made uniform, the milk coming from suitable tanks or centrifugal milk separators. The screw 28 is so adjusted as to control the acidity of the whey leaving pipe 33. A very satisfactory condition is to draw off the whey while having an acidity equivalent to about 0.35% of lactic acid. But the acidity can vary substantially, e. g. from 0.28% to 0.46%, figured as lactic acid. The water may flow into compartment E at such a rate that the outgoing wash water leaving by pipe 48 has an acidity of approximately 0.06%, figured as lactic acid. This figure can vary somewhat.

Sometimes the force of the stream of hot water from pipe 44 against the soft casein to be washed and cooked, may cause considerable foaming in compartment D. For this purpose a water spray, which can conveniently be cold water, may be provided at 56.

The compartment consisting of tanks D—E—F can be suitably supported on four posts 57, which may be made of angle iron.

A rotatable rod or tube 58 may be positioned between the two back legs 57, and rigidly attached to this is a rock arm 59 the end of which is connected to a link 60, which is attached to the gate valve 61, for use in cleaning the tank after the completion of a run. For opening the valve 61 a handle 63 is rigidly attached to 58. By raising this handle, the gate valve 61 is opened.

It will be observed that between the front wall of the curdling tank (composed of compartments A, B and C) and the back wall of washing and cooking tank (composed of compartments D, E and F) is a space 64, except that supports 65 are provided at the top and bottom. In other words, the curdling tank and the washing and cooking tank are, at most places, not in direct contact with each other. This assists in maintaining a much higher temperature in the washing and cooking tank than in the curdling tank.

It is to be understood that in place of strong sulphuric acid, other acids to be fed to tank 19, other acids such as weaker sulphuric acid, hydrochloric, acetic or lactic acids, etc., or a very sour whey, if desired, can be employed, the amount of these other acids being adjusted to give the same acidity to the whey leaving through pipe 30—33.

What is claimed is:

1. An apparatus for treating a liquid which comprises a tank having a mixing chamber in the lower part thereof, a feed conduit leading into said mixing chamber suitable for introducing skim milk thereinto, a second conduit leading into said mixing chamber suitable for introducing acid thereinto, and controllable heating means for said mixing chamber, an upstanding baffle in said tank extending upwardly from the bottom of said tank only to below the normal liquid level therein, and a downwardly extending baffle in said tank extending from above the normal liquid level in said tank to substantially below the normal liquid level therein, said downwardly extending baffle being more remote from said mixing chamber than is said upstanding baffle, said baffles dividing said tank into three compartments, two of which communicate with each other only at their upper parts, and two of which communicate with each other only at their lower parts, an outlet for liquid from a compartment of said tank beyond said downwardly extending baffle, said outlet constituting a means for maintaining a normal working liquid level in said tank, a second tank, an overflow suitable for allowing intermediate product to pass from the upper part of said first mentioned tank to said second tank, said overflow being located between said upstanding baffle and said downwardly extending baffle, the upper portion of said second tank being divided into compartments by a plurality of baffles extending from above the normal working liquid levels therein to different depths substantially below the normal liquid levels in said second tank but above the bottom of said second tank, said baffles dividing the upper part of the second tank into three compartments, namely a washing and cooking compartment, a product outlet compartment and a wash water compartment, said three compartments being in communication with each other in said tank below said baffles, and means for forcing a strong stream of hot water from said wash water draw off compartment toward a position in said washing and cooking compartment below the said overflow for intermediate product, and means for controlling the temperature of said stream of hot water, separate outlets for separately drawing off the wash water and the cooked and washed product from said second tank, the said outlet for drawing off wash water being vertically adjustable and thereby constituting a means for maintaining a normal working liquid level in said washing and cooking compartment.

2. Apparatus as claimed in claim 1, having aerating means in said first mentioned feed conduit, in advance of said mixing chamber.

3. Apparatus as claimed in claim 1, having associated with said second mentioned feed conduit leading into said mixing chamber, a constant level tank, a flexible tube adapted to discharge liquid from said constant level tank into said feed conduit, and means for raising and lowering the discharge end of said flexible tube.

4. Apparatus as in claim 1, in which the second mentioned feed conduit to the mixing chamber and the top and a side of said mixing chamber are removable as a unit, for cleaning.

5. In an apparatus suitable for producing washed and cooked casein, the herein described combination of a first tank and a second tank, said first tank containing, in the order stated, a mixing chamber, having a heating means, an upstanding baffle extending upwardly from the bottom of said tank to below the normal liquid level to be maintained in said tank, an overflow into said second tank, a downwardly extending baffle extending downwardly from above the normal liquid level to a level below the level of the top of said upstanding baffle but above the bottom of said tank, and a vertically adjustable liquid outlet, said outlet constituting a means for maintaining a normal working liquid level in said first tank, said mixing chamber being provided with a feed conduit suitable for introducing liquid to be treated thereinto, and with a second inlet conduit suitable for introducing liquid precipitating agent thereinto, said second tank having two downwardly extending baffles, extending downwardly from above the normal liquid levels therein, to different depths above the bottom of said tank, means for directing a strong stream of hot water against a zone in said second tank directly below the said overflow, and separate draw-off outlets for the cooked washed product and for the wash water, said outlet for drawing off the wash water being adjustable as to height and arranged for maintaining normal liquid working levels in said second tank, the baffles in the said second tank dividing the upper part of said tank into compartments which communicate with each other below said baffles.

6. In an apparatus suitable for producing cooked casein, a curdling tank adapted to contain skim milk, a downwardly extending baffle in said curdling tank extending from above the normal liquid level in said tank to well below the said normal liquid level therein, thereby dividing the upper part of the curdling tank into two compartments (AB) and C, a second baffle positioned in compartment (AB), extending upwardly from the bottom of said tank to substantially below the normal liquid level in said tank, said second baffle dividing the lower part of compartment (AB) into two parts A and B, B being intermediate between A and C, a mixing chamber located in the part A, said mixing chamber being provided with a conduit suitable for introducing liquid to be treated into said mixing chamber, another conduit suitable for introducing a liquid treating agent into said mixing chamber, and said mixing chamber also being provided with heating means; an overflow means located in the upper part of said compartment (AB), said overflow being adapted to deliver precipitated product to a second tank adapted for washing and cooking said product, and a vertically adjustable outlet for liquid in the said compartment C of said curdling tank adapted for drawing off residual portion of treated liquid and for maintaining a normal liquid level in said curdling tank, a second tank having means for projecting a strong flow of hot water against a position therein below said overflow means, and separate outlet means adapted for separately drawing off product washed and cooked by said hot water, and wash water, from said second tank.

VERNON J. LOWE.
ARTHUR W. BEAN.